United States Patent [19]

Frith

[11] 4,157,617

[45] Jun. 12, 1979

[54] ANIMAL SKINNING KNIFE

[76] Inventor: Marvin E. Frith, Rte. #2, Box #40, Coffeeville, Miss. 38922

[21] Appl. No.: 881,654

[22] Filed: Feb. 27, 1978

[51] Int. Cl.² ............... B26B 11/00; B26B 29/02
[52] U.S. Cl. ............................................. 30/294
[58] Field of Search ................. 30/287, 294, 295, 286

[56] References Cited

U.S. PATENT DOCUMENTS

| 256,700 | 4/1882 | Jincks | 30/294 |
|---|---|---|---|
| 1,546,975 | 7/1925 | Feller | 30/286 |
| 2,810,194 | 10/1957 | Unsinger | 30/294 X |
| 3,100,935 | 8/1963 | Leafe | 30/294 |
| 3,241,236 | 3/1966 | Capps | 30/294 X |
| 3,380,159 | 4/1968 | Winston | 30/294 X |
| 3,605,268 | 9/1971 | Cassell | 30/294 |

Primary Examiner—Jimmy C. Peters
Attorney, Agent, or Firm—John R. Walker, III

[57] ABSTRACT

A knife for use in skinning game animals such as deer. The knife includes a handle and a unitary, one-piece blade. The blade is constructed in such a manner so as to cause the skin of the animal being skinned to be fed into the cutting edge thereof without causing undue pressure to be applied to the cutting edge and to separate the skin as it is cut and to prevent any portion of the body of the person skinning the animal from coming in contact with the cutting edge.

5 Claims, 6 Drawing Figures

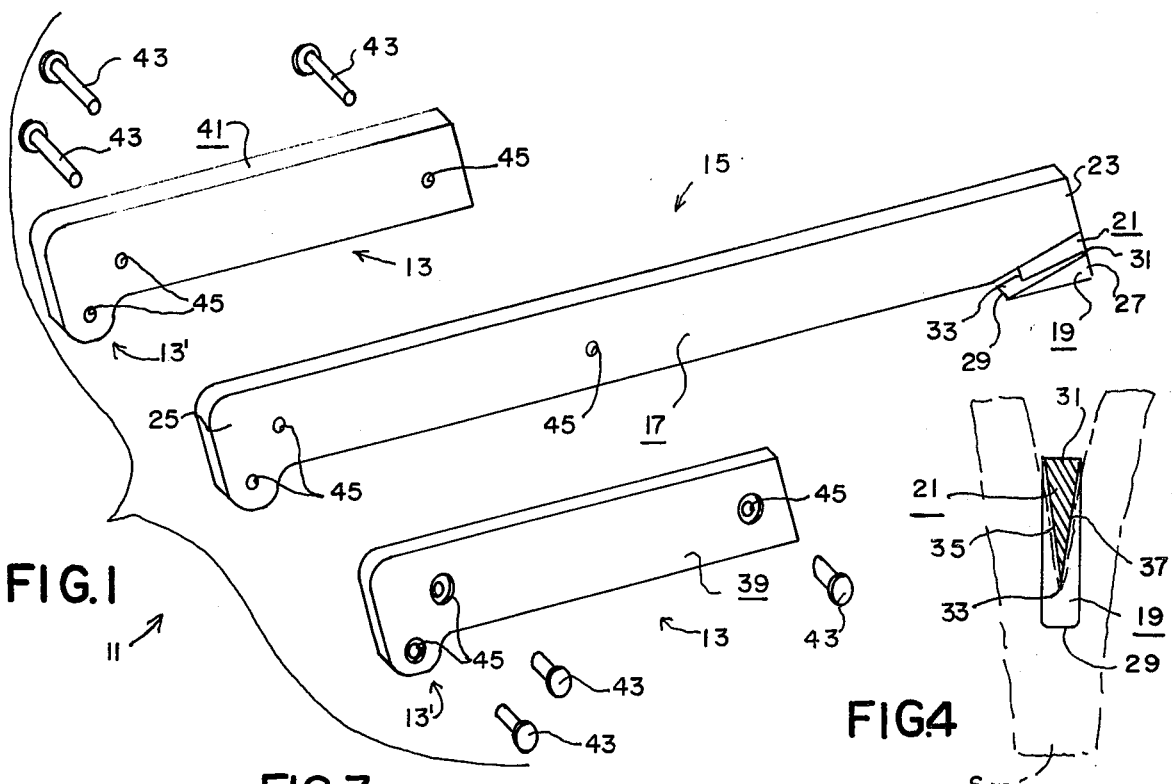
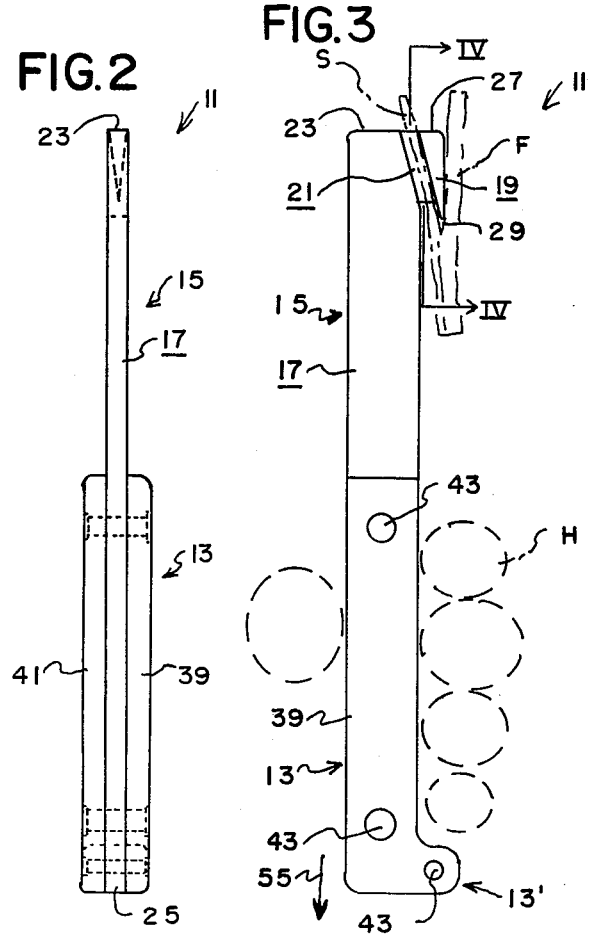
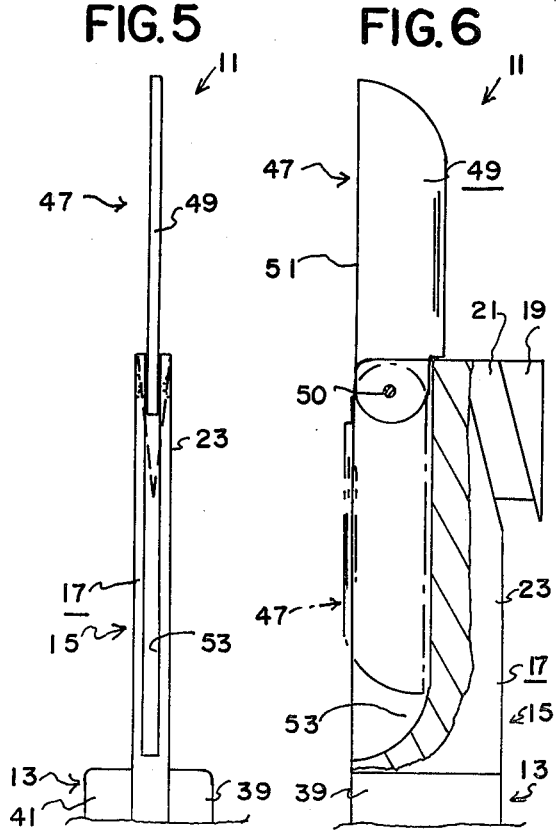

ANIMAL SKINNING KNIFE

BACKGROUND OF THE INVENTION

1. Field of the Invention

This invention relates generally to knives and more specifically to knives for skinning game animals.

2. Description of the Prior Art

Heretofore, various knives have been developed for skinning game animals. See, for example, Abbey, U.S. Pat. Nos. 732,911; Eckley, 838,852; Martin, 1,477,510; Unsinger, 2,810,194; Cromoga, 2,906,021; Capps, 3,241,236; Knudson, 3,445,931; Regan, 3,791,033; and Addis, 3,839,788. None of the above patents disclose or suggest the present invention.

Knives used to skin game animals must, in order to be entirely satisfactory, be constructed in such a manner so as to cause the skin of the animal being skinned to be fed into the cutting edge thereof without causing undue pressure to be applied to the cutting edge, separate the skin as it is cut, and prevent any portion of the body of the person skinning the animal from coming in contact with the cutting edge, in addition to being simple and inexpensive to manufacture, reliable and substantially break-free, etc. While certain prior art skinning knives have met some of these requirements, no prior art skinning knife has met all of these requirements. Vaughan, U.S. Pat. No. 2,691,822 discloses a cable stripping tool which is somewhat similar in structure to the present invention. The function and utility of the Vaughan cable stripping tool is, of course, far removed from that of the present invention. The Vaughan cable stripping tool does not disclose or suggest the present invention.

SUMMARY OF THE INVENTION

The present invention is directed towards overcoming the problems and disadvantages of prior animal skinning knives. The concept of the present invention is to construct a knife in such a manner so as to cause the skin of the animal being skinned to be fed into the cutting edge of the knife without causing undue pressure to be applied to the cutting edge, to separate the skin as it is cut, and to prevent any portion of the body of the person skinning the animal or those near him from coming in contact with the cutting edge, in addition to being simple and inexpensive to manufacture, reliable, and substantially break-free, etc.

The animal skinning knife of the present invention includes a handle and a unitary, one-piece blade means. The blade means includes an angled slot therein of a size which allows the skin of the animal being skinned to be fed thereinto but which prevents any part of the body of the person skinning the animal or those near him from entering. The slot leads to the cutting edge of the knife and is angled so as to cause the skin of the animal being skinned to be fed into the cutting edge of the knife when the knife is pulled down the body of the animal and without causing undue pressure to be applied to the cutting edge. The cutting edge is angled so as to separate the skin as it is cut thereby.

BRIEF DESCRIPTION OF THE DRAWINGS

FIG. 1 is an exploded perspective view of the knife of the present invention.

FIG. 2 is a top plan view thereof.

FIG. 3 is a side elevational view thereof with a portion of the animal being skinned and the user's hand being shown in broken lines.

FIG. 4 is a sectional view thereof as taken on line IV—IV of FIG. 3.

FIG. 5 is a top plan view of a portion of a modified embodiment thereof.

FIG. 6 is a partial sectional side elevational view of FIG. 5.

DESCRIPTION OF THE PREFERRED EMBODIMENT

The animal skinning knife 11 of the present invention is for use in skinning an animal such as a deer, goat, steer, etc. The knife 11 includes a handle 13 and a unitary, one-piece blade means 15 (see FIG. 1). The blade means 15 includes a first member 17, and a second member 19, and a throat member 21 integrally joining the first and second members 17, 19 together (see FIG. 1). The first member 17 of the blade means 15 is elongated and has a blunt first end 23 and a blunt second end 25. The second member 19 of the blade means 15 is elongated and has a blunt first end 27 and a second end 29. The throat member 21 of the blade means 15 is elongated and has a blunt first end 31 and a second end 33 and has a first side 35 and a second side 37. The top edge of the throat member 21 is integrally attached to the bottom edge of the first end 23 of the first member 17. The bottom edge of the throat member 21 is integrally attached to the top edge of the first end 27 of the second member 19. The second end 29 of the second member 19 extends past the second end 33 of the throat member 21 as clearly shown in the drawings. The first and second sides 35, 37 of the throat member 21 slope uniformly towards one another from the first end 31 thereof to the second end 33 thereof to form a wedge-shaped cutting edge terminating at the second end 33 of the throat member 21 for cutting the skin of the animal being skinned and for separating the skin along the cut after it has been cut. The top edge of the second member 19 slopes upwardly continuously from the second end 29 thereof to the first end 27 thereof preferably at substantially a 15° angle for guiding the skin of the animal being skinned to the cutting edge of the throat member 21 and for separating the skin of the animal being skinned from the flesh thereof. The bottom edge of the first member 17 preferably slopes upwardly continuously from a location directly above the second end 29 of the second member 19 to the first end 23 thereof at an angle substantially parallel to the top edge of the second member 19. The distance between the top of the second member 19 and the bottom of the first member 17 at the second end 29 of the second member 19 is sufficient to allow the skin of the animal being skinned to pass therebetween but is insufficient to allow any portion of the body of the person using the knife 11 from inadvertently passing therebetween to thereby prevent the person using the knife 11 from being inadvertently cut by the cutting edge of the knife 11. The relative size of this distance or gap can be readily seen by comparing the size of the fingers of the hand H of the user to the size of the gap in FIG. 3. The blade means 15 is preferably made entirely of a high grade tool steel.

The handle 13 preferably includes two side members 39, 41 fixedly attached to the second end 25 of the first member 17 of the blade means 15 by way of rivets 43 or the like which pass through apertures 45 in the side members 39, 41 and the second end 25 of the first member 17. The handle 13 may have an outwardly projecting portion 13' (see FIG. 3) for aid in preventing the knife 11 from slipping from the grip of the user thereof. The handle 13 may be made of metal or the like.

A modified embodiment of the knife 11 is shown in FIGS. 5 and 6. This embodiment, the knife 11 includes a secondary blade means for initially cutting a slit in the skin of the animal to be skinned to allow the second member 19 to easily be inserted thereinto in a manner which will hereinafter become apparent. The secondary blade means 47 includes an elongated body member 49 pivotally attached to the first end 23 of the first member 17 of the blade means 15 by way of a pivot 50 or the like for movement between an opened, in-use position as shown by solid lines in FIGS. 5 and 6 and a closed, out-of-use position as shown by broken lines in FIG. 6. The body member 49 has a cutting edge 51. The first member 17 of the blade means 15 has an elongated recess 53 in the top edge of the first end 23 thereof for receiving the body member 49 when the body member 49 is in the closed, out-of-use position with the cutting edge 51 directed against the bottom of the recess as shown by broken lines in FIG. 6 for protecting the user of the knife 11 from the cutting edge 51 when the secondary blade means 47 is not being used.

To use the knife 11 to skin an animal, the first step is to make a slit in the skin of the animal with the secondary blade means 47 or with a standard knife or the like. This slit allows the second end 29 of the second member 19 to be inserted between the skin S and the flesh F of the animal (see FIG. 3). The knife 11 is then pulled downwards as indicated by the arrow 55 in FIG. 3. The slope of the second member 19 will cause the skin S of the animal to be guided to the cutting edge of the throat member 21 as shown in FIG. 3 without causing undue pressure to be applied to the cutting edge. The wedge-shape of the throat member 21 will cause the skin S to separate along the cut after it has been cut as clearly shown in FIG. 4.

Although the invention has been described and illustrated with respect to a preferred embodiment thereof, it is not to be so limited since changes and modifications may be made therein which are within the full intended scope of the invention.

I claim:

1. An animal skinning knife comprising: a handle and a unitary one-piece blade means; said blade means including a first member, a second member, and a throat member integrally joining said first and second members together; said first member of said blade means being elongated and having a blunt first end and a blunt second end, said second member of said blade means being elongated and having a blunt first end and a second end and having a top edge and a bottom edge, said throat member of said blade means being elongated and having a blunt first end and a second end and having a first side and a second side and having a top edge and bottom edge, said top edge of said throat member being integrally attached to said bottom edge of said first end of said first member of said blade means, said bottom edge of said throat member being integrally attached to said top edge of said first end of said second member of said blade means, said second ends of said first and second members extending past said second end of said throat member, said first and second sides of said throat member sloping uniformly towards one another from said first end of said throat member to said second end of said throat member to form a wedge-shaped cutting edge terminating at said second end of said throat member for cutting the skin of the animal being skinned and for separating the skin along the cut after it has been cut, said top edge of said second member sloping upwardly relative to said bottom edge of said second member continuously from said second end of said second member to said first end thereof for guiding the skin of the animal being skinned to cutting edge of said throat member and for separating the skin of the animal being skinned from the flesh thereof, said cutting edge of said throat member being straight and being perpendicular to the longitudinal axis of said first member, said handle being fixedly attached to said second end of said blade means.

2. The animal skinning knife of claim 1 in which the distance between said top of said second member and said bottom of said first member at said second end of said second member is sufficient to allow the skin of the animal being skinned to pass therebetween while preventing any portion of the skinner's body from inadvertently passing therebetween to thereby prevent the skinner fom inadvertently cutting himself.

3. The animal skinning knife of claim 2 in which said bottom edge of said first member of said blade means slopes upwardly continuously from a location directly above said second end of said second member to said first end thereof at an angle substantially parallel to said top edge of said second member.

4. The animal skinning knife of claim 3 in which said top edge of said second member of said blade means slopes upwardly continuously from second end of said second member to said first end thereof at substantially a 15° angle.

5. A blade means for use in skinning animals, said blade means comprising:
    (a) an elongated first member having a blunt first end and a second end and having a top and a bottom;
    (b) an elongated second member having a blunt first end and a second end and having a top and a bottom; and
    (c) a throat member having a blunt first end and a second end and having first and second sides and having a top and bottom, said top of said throat member being fixedly attached to said bottom of said first member substantially adjacent said first end of said first member, said bottom of said throat member being fixedly attached to said top of said second member substantially adjacent said first end of said second member, said second ends of said first and second extending past said second end of said throat member, said first and second sides of said throat member sloping uniformly towards one another substantially from said first end of said throat member to said second end of said throat member to terminate in a wedge-shaped cutting edge at said second end of said throat member for cutting the skin of the animal being skinned and for separating the skin of the animal along the cut after it has been cut, said cutting edge of said throat member being straight and being substantially perpendicular to the bottom of said second member; said top of said second member sloping upwardly at an angle relative to said bottom of said second member from said second end of said second member to said first end of said second member to form a wedge shaped cam surface for guiding the skin of the animal being skinned to said cutting edge of said throat member and for separating the skin of the animal being skinned from the flesh thereof.

\* \* \* \* \*